(12) United States Patent
Harper

(10) Patent No.: US 6,581,656 B1
(45) Date of Patent: Jun. 24, 2003

(54) PORTABLE POWER TOOL EXTENSION TABLE

(76) Inventor: Donald A. Harper, 7871 Tara Rd., Jonesboro, GA (US) 30236

( * ) Notice: Subject to any disclaimer, the term of this patent is extended or adjusted under 35 U.S.C. 154(b) by 0 days.

(21) Appl. No.: 10/109,079

(22) Filed: Mar. 29, 2002

Related U.S. Application Data

(63) Continuation-in-part of application No. 09/844,418, filed on Apr. 30, 2001.

(51) Int. Cl.[7] .................................................. B25H 1/04
(52) U.S. Cl. .................. 144/287; 144/286.5; 269/289 R
(58) Field of Search ........................... 144/286.5, 286.1, 144/287, 285; 83/471.3, 473, 581, 605, 859, 574, 490; 269/289 R, 309, 901

(56) References Cited

U.S. PATENT DOCUMENTS

| | | | |
|---|---|---|---|
| 4,561,336 A | * 12/1985 | Davis | 84/453 |
| 4,860,807 A | * 8/1989 | Vacchiano | 144/286.1 |
| D366,050 S | * 1/1996 | Hinds | D15/133 |
| 5,497,816 A | * 3/1996 | Darland | 144/287 |

* cited by examiner

Primary Examiner—Allen Ostrager
Assistant Examiner—Shelley Self

(57) ABSTRACT

Two embodiments for a portable, elongated miter saw table for on site placement on a supporting surface, such as an open tail gate of a pick up truck, or a pair of saw horses. The table includes a pair of lateral work support members having a central well therebetween for receiving a miter saw. In a first embodiment each work support member includes a slidably engaging, U-shaped extension that features a raised transverse member, whereby the transverse member, along with the extension members, define a continuous planar support work surface. For the second embodiment, the lateral work support members are removably secured to a planar central well member, where the lateral work support members are spaced apart and horizontally aligned above the central well member.

4 Claims, 4 Drawing Sheets

PORTABLE POWER TOOL EXTENSION TABLE

RELATED APPLICATION

This application is a Continuation-In-Part of Ser. No. 09/844,418, filed Apr. 30, 2001, under the title, "Portable Mitre Saw Extension Table", by the inventor hereof, where the contents thereof are incorporated herein by reference.

FIELD OF THE INVENTION

This invention, and the parent application, are directed to the field of portable power tool supports, more particularly to a portable extension table, such as for a mitre saw, that features a central well for receiving the mitre saw.

BACKGROUND OF THE INVENTION

The respective inventions relate to a portable mitre saw extension table that has utility for on-site use, such as in conjunction with the flat bed of a pick up truck, a work bench, or with the use of conventional saw horses in one's basement work shop.

Saw horses, as known in the art, comprise a pair of legs hinged at the support end for receiving a table top or plural 2×4's to form a table for seating the mitre saw or other power tool. Saw horses remain today as a convenient means to allow on-site use of power tools. More recent innovations have been developed to enhance the use of power tools at locations from one's workshop. Several of such innovations are reflected in the following U.S. Patents:

a.) U.S. Pat. No. 5,863,052, to Roman, relates to a portable collapsible work station for quick set up and storage. The work station comprises an elongated frame structure including a pair of side frames. A collapsible wheel carrying frame is pivotally mounted at a first intermediate position of the elongated frame structure. The collapsible wheel carrying frame being pivoted on the elongated frame structure from a storage position lying within a horizontal plane through the elongated frame structure to an extended operating position for supporting the elongated frame structure. A support leg structure is pivotally mounted at a second intermediate position of elongated frame structure enabling the support leg structure to be moved from a storage position coplanar with the collapsible wheel carrying frame to the extended operating position for supporting the elongated frame structure. A power tool is rotatably secured to the elongated frame structure for rotation from a tool storage position located internally of the elongated frame structure to a tool operating position on top of the elongated frame structure.

b.) U.S. Pat. No. 5,518,053, to Robison, teaches a work support composed of a work surface mounted on a frame adapted to support a piece of work; and at least one laterally adjustable support cooperatively associated with the work surface. The adjustable support includes a support surface, at least one telescoping structure having a plurality of telescoping sections, wherein one of the telescoping sections has an end attached to the frame and another of the telescoping sections has an end in communication with the support surface.

c.) U.S. Pat. No. 5,329,979, to Miller et al., is directed to a portable work table adapted for being removably positioned within a storage compartment of a vehicle. The table includes a frame having an upper wall with a generally planar top surface, side walls extending from the upper wall and a bottom wall extending between the side walls. A plurality of legs are movably mounted on the frame and are movable between a first position such that the legs extend from the bottom surface for being engaged with a support surface such that the frame is positioned above the support surface to permit work to be readily carried out on the top surface and a second position such that the legs are retracted from the first position towards the bottom surface such that the frame is positionable within the storage compartment of the vehicle. A plurality of objects are movably mounted on the frame. A storage device is interconnected between the frame and each of the objects for allowing each object to move with respect to the top surface of the frame between a first position such that the object is positioned within the interior of the frame below the top surface and a second position such that the object is positioned at least partially above the top surface of the frame.

d.) U.S. Pat. No. 4,798,113, to Viazanko, relates to a table for a mitre saw having an extension table detachably attached thereto at each end. The extension table carries a fence in alignment with the mitre table fence, and the fence carries a movable stop and index scale. The stop can be fit on either the left or right extension table fence. The mitre saw is preferably mounted on its own base, with the base being provided with wheels for easy transport and removable legs for support. The left and right extension tables each have pivotable support legs and, when detached, the extension tables are carried and protected in a carrying case.

Only the patent from the above selection dealing exclusively with mitre saws, and the problems associated therewith, is the patent to Viazanko. As is known in the woodworking trades, mitre saws are extensively used in finish carpentry. When finish coping, baseboard and other trim strips are applied, they must be accurately cut to length and accurately cut to the proper angle, such as 45°, for joining the adjacent trim. A mitre saw has a table which carries a fence, a base having a table surface, and a rotary saw blade that is pivoted about a swing axis, and the blade can be swung down at least partially into a slot in the table surface. Additionally, the saw is mounted to rotate about an upright axis so that the angle of the blade, with respect to the fence, can be adjusted.

A short coming of mitre saws is that often the trim or other item to be cut is quite long compared to the table surface. As a consequence, there may be considerable overhang which can be difficult to control to make the desired precise cut. Extension tables, such as taught in Viazanko, have thus been proposed to alleviate some of the concerns with cutting long pieces of trim. Unfortunately, using such extension tables can be difficult to transport to on-site locations where the mitre saw may required. Ease of transportability and set up are critical to an effective use of a mitre saw away from the convenience of a workshop.

The present invention represents an effective and portable means to mount a mitre saw for on-site use, and to a kit of components to be readily assembled by a do-it-yourself handyman, where a pair of vertically positioned extension members are provided that are flush with the table surface of the mitre saw, thus ensuring an extensive planar surface to support a long piece, such as wood trim, for cutting. The manner by which these inventions achieve the goals hereof will become more apparent in the description which follows, particularly when read in conjunction with the accompanying drawings.

SUMMARY OF THE INVENTION

This invention relates, in two preferred embodiments, to a readily transportable, easy-to-assemble mitre saw support for use at job site locations or in one's work shop. In a first embodiment, the mitre saw support comprises an elongated table having a central well for receiving the mitre saw and a pair of aligned table extensions, where the supporting surfaces of the respective extensions are planarly aligned with the table surface of the mitre saw. Each extension includes a pair of side members having plural lateral members to define the supporting surface thereof. Additionally, a telescopic member, slidably received within the respective side members, is provided, where the telescopic member includes a cross member having a raised surface that is flush with the supporting surface of the side members and corresponding plural lateral members. By this arrangement, a long planar support is achieved for precise cutting of extended wood pieces, such as trim, etc. For ease of transportability, the under surface of one extension may be provided with a pair of wheels to allow movement and placement of the mitre saw support.

In a second embodiment, particularly for use by do-it-yourself handyman, comprises a first planar mitre saw support member, and a pair of second support members to be removably fixed to and vertically off set from the first planar member by plural angled bracket members. With the respective second support members spaced apart, but horizontally aligned, a convenient extended support is provided for supporting an elongated piece of wood being cut or trimmed by the mitre saw.

Accordingly, an object of this invention is to provide a portable mitre saw table, for job site or work shop use, that, by the use of movable or removably fixed extensions, ensures easy control in the precise cutting of long, often difficult to handle wood strips.

Another object hereof for a first embodiment is the provision of a pair of sliding extensions that ensures an extended planar support surface for elongated pieces of wood strips, such as trim.

A further object of the second embodiment of this invention is the provision of a kit of components that may be readily assembled, such as by a do-it-yourself handyman, to present a portable mitre saw extension table to facilitate the cutting or trimming of elongated pieces of wood.

Still another object of the invention is the provision of a central well in the mitre saw table for recessing the mitre saw to provide a planar support surface in cooperation with the table surface of the mitre saw.

These and other objects of the invention will become apparent from the further description which follows.

DETAILED DESCRIPTION OF PREFERRED EMBODIMENT

Figure 1:
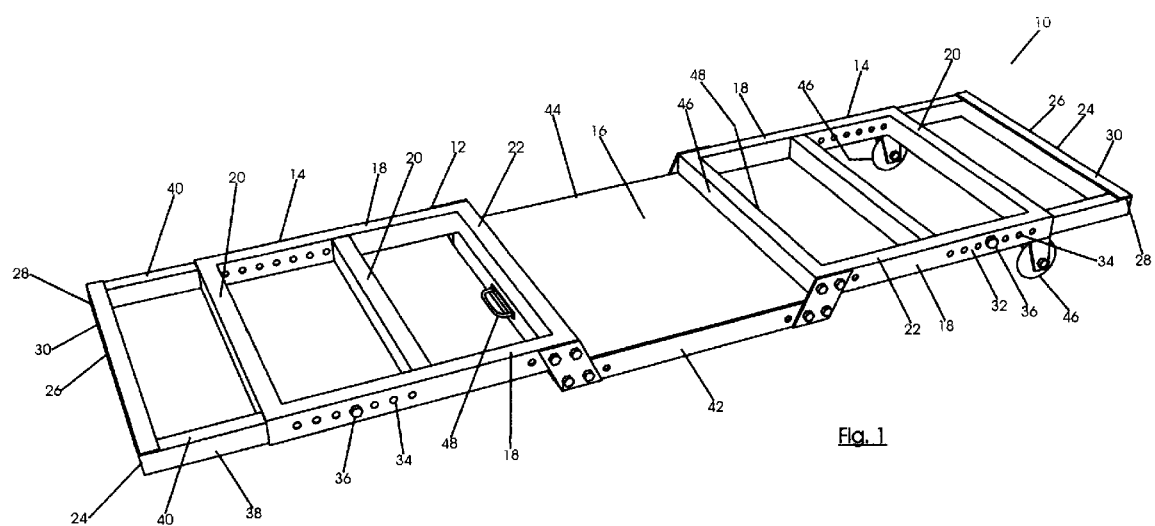
FIG. 1 is a perspective view of a first embodiment for the portable mitre saw extension table according to the present invention.

The present invention is directed to a portable mitre saw extension table that has particular utility for transporting and setting up at job site locations. The mitre saw extension table, in two preferred embodiments, hereof will now be described with regard to the four Figures, where like reference numerals represent like components or features in the several Figures.

Figure 2:
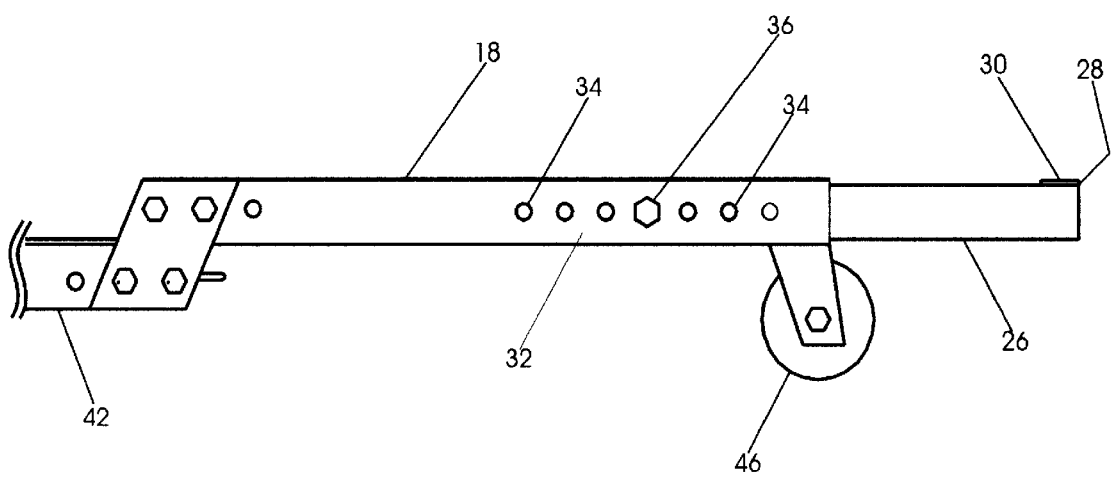
FIG. 2 is a partial side view illustrating the sliding extension for the portable mitre saw table of the embodiment of FIG. 1, showing in particular the raised surface portion to provide a planar surface with the table.

Turning now to FIGS. 1 and 2, illustrating the structural details of a first embodiment for the mitre saw extension table 10 of this invention, the mitre saw extension table 10 comprises an elongated frame member 12 having a pair of table extensions 14, with a central well 16 for receiving the mitre saw (not shown), as known in the art, therebetween. The table extensions 14 each consist of a pair of parallel side members 18, preferably formed of tubular, rectangularly configured aluminum, with plural transverse members 20, where the respective upper surfaces 22 define a planar work piece supporting surface. Additionally, the respective side members 18 receive slidable, U-shaped extensions 24, where the closed end 26 includes a raised surface 28 such that the upper surface 30 is coextensive to the upper surfaces 22 of the table extensions, note in particular FIG. 2. By this arrangement, a flush supporting surface of extended length is provided to ensure support for a wood piece placed thereon. Finally, to temporarily fix the relationship between the extension 14 and its sliding U-shaped extension 24, the vertical wall 32 may include a series of openings 34 for temporarily engaging a spring biased button 36 along the vertical wall 38 of the legs 40 of the U-shaped extension, a known latching mechanism for telescopically engaging members.

Between the respective table extensions 14 is a central well 16, defined by front and rear supports 42, 44, respectively, and side walls 46, where such side walls form part of the adjacent table extension 14. Most currently available mitre saws include a housing featuring an upper support surface, where the depth of the housing is of one or two dimensions, and the difference therebetween is about 1". Thus, the depth of the central well is of a dimension to receive the thicker housing, whereby the upper support surface is coextensive with the upper surfaces 22. Accordingly, a continuous support surface for the wood product is provided, whereby to facilitate user control of such wood product. in the event the smaller mitre saw is used, a simple rectangular insert (not shown) may be placed on the supports 42, 44 in the well 16 to raise the smaller mitre saw to a proper height to ensure the continuous support surface for the wood product being cut.

To facilitate transporting of the elongated frame member 12, a pair of rollers 46, positioned on the underside of one table extension 14, may be provided. That is, the frame member 12, held at the opposite end by hand gripping the second table extension, may be wheeled to and positioned at the desired location. Additionally, a further pair of handles 48 may be included to lift the frame member 12 into position. A preferred placement for the portable mitre saw table may be on the rotated or extended tail gate of a pick up truck, or on a pair of conventional saw horses (shown in phantom in FIG. 1).

Figure 3:
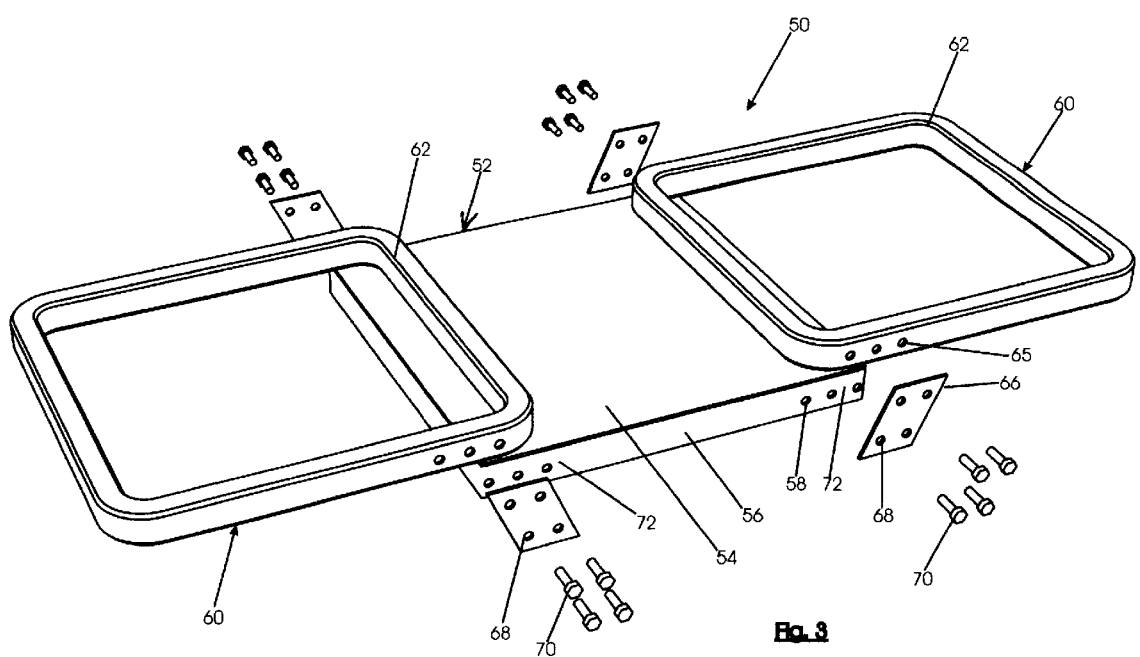
FIG. 3 is an exploded perspective view for a second embodiment for the mitre saw support table extension, showing in particular the respective components necessary to fabricate the support table extension of this invention.
Figure 4:
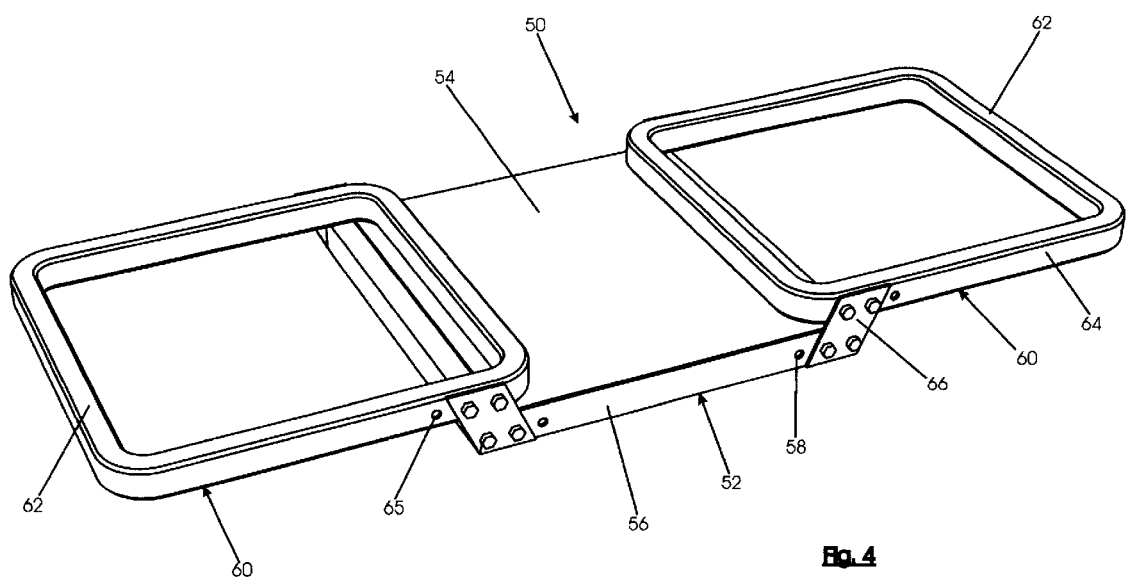
FIG. 4 is an assembled perspective view of the second embodiment for the mitre saw support table extension according to this invention.

FIGS. 3 and 4 illustrate a second embodiment for the mitre saw table support 50, where the second embodiment has particularly utility as a kit of components to be assembled, and disassembled for storage, by the handyman, do-it-yourself contractor. The second preferred embodiment, as illustrated in FIGS. 3 and 4, comprises a first planar support member 52 having an upper surface 54 to support the mitre saw (not shown) and a peripheral wall 56 containing a series of apertures 58 as later discussed.

Additionally, the second embodiment includes a pair of second support members 60, where a preferred shape is rectangular and formed by metal tubing, such as aluminum, with a generally square cross section. Further, the support members 60 feature an upper planar surface 62 and an outer peripheral wall 64 having a series of apertures 65.

To removably fix the respective first planar support member 52 and the pair of second support members 60 to each other, a plurality, i.e. four, angled brackets 66 are provided. A preferred shape for the angled brackets 66 consists of two sets of parallel edges, where the sets are angled to one another. The brackets 66 further include plural openings 68 to receive complementary fastener elements 70, as known in the art, where a first set of said openings receive fastener elements to secure same to the first planar support member at apertures 58. An upper set of openings 68 receive a further set of fastener elements 70 to secure the bracket to a said second support member 60. Similarly, the remaining corners 72 are secured, as described above, with the result shown in FIG. 3. It will be noted that the respective peripheral walls 56, 64 contain at least three apertures 58, 65, respectively, to allow for a lateral adjustment of the assembly. Though not shown, the various components may be readily packed or placed in a suitable storage box, as a convenient means to store or transport the mitre saw assembly to a desired location.

It is recognized that changes, variations and modifications may be made to the portable mitre saw table of this invention, especially by those skilled in the art, without departing from the spirit and scope thereof. Accordingly, no limitation is intended to be imposed on the invention except as set forth in the accompanying claims.

What is claimed is:

1. A kit of components for the assembly of a mitre saw extension table for removably mounting to a supporting surface, said kit comprising:

a.) a first planar member to lie contiguous to said supporting surface, where said first planar member includes a peripheral wall having a series of apertures for receiving plural fasteners, b.) a pair of second support members featuring at least an upper planar surface and peripheral walls having a first series of apertures for receiving plural fasteners, each said second support member having a telescopic member for removably securing thereto by means of a second series of apertures along said peripheral walls, and lockable by spring biased buttons;

c.) a pair of elongated members having a mounting surface and an opposed upper surface for mounting to said telescopic members, where the thickness thereof is such as to place said upper surface in planar alignment with the upper surface of said second support members; and, d.) four angled brackets, mountable along said peripheral wall, for removably securing said pair of second support members in a spaced apart relationship to said first planar member, where said second support members would be vertically displaced from said first planar member.

2. The kit of components according to claim 1, including plural fasteners operable to connect said brackets to said first planar member and second support members.

3. The kit of components according to claim 2, where said angled brackets feature a pair of parallel edges, where a first set of edges are angled to a second set of edges.

4. The kit of components according to claim 2, where said second support members are generally rectangular in shape and formed of a tubuler metal having a generally square cross section.

* * * * *